United States Patent [19]

Sugano

[11] Patent Number: 4,765,203
[45] Date of Patent: Aug. 23, 1988

[54] ENGINE BRAKE CONTROL FOR AUTOMATIC TRANSMISSION

[75] Inventor: Kazuhiko Sugano, Yokohama, Japan

[73] Assignee: Nissan Motor Co., Ltd., Yokohama, Japan

[21] Appl. No.: 890,370

[22] Filed: Jul. 29, 1986

[30] Foreign Application Priority Data

Jul. 30, 1985 [JP] Japan ................... 60-166647

[51] Int. Cl.$^4$ ........................... B60K 41/04
[52] U.S. Cl. ........................ 74/869; 74/878
[58] Field of Search .................. 74/878, 869

[56] References Cited

U.S. PATENT DOCUMENTS

| | | | |
|---|---|---|---|
| 4,148,232 | 4/1979 | Moriya | 74/869 |
| 4,395,926 | 8/1983 | Kubo et al. | 74/869 |
| 4,437,358 | 3/1984 | Kubo et al. | 74/869 X |
| 4,566,355 | 1/1986 | Sugano | 74/869 |
| 4,574,925 | 3/1986 | Nishimura et al. | 74/878 X |
| 4,580,466 | 4/1986 | Iwanaga | 74/877 X |
| 4,637,281 | 1/1987 | Vanselous | 74/869 |
| 4,665,776 | 5/1987 | Sugano | 74/869 X |
| 4,680,992 | 7/1987 | Hayasaki et al. | 74/869 |

OTHER PUBLICATIONS

General Motors Corporation, H 700-R4-195-7/83, p. 68; "Complete Hydraulic Oil Circuits".

Primary Examiner—Leslie A. Braun
Assistant Examiner—James W. Innskeep
Attorney, Agent, or Firm—Foley & Lardner, Schwartz, Jeffery, Schwaab, Mack, Blumenthal & Evans

[57] ABSTRACT

There is provided in an automatic transmission a shift valve which is provided with a plug movable responsive to an engine brake command to hold a valve spool of the shift valve to a downshift position thereof. The plug is designed to supply working hydraulic pressure to an engine brake friction element after it has moved responsive to the engine brake command to hold the valve spool of the shift valve to the downshift position thereof. When the engine brake command is not available, the plug allows the valve spool of the shift valve to move between the downshift position thereof and an upshift position thereof.

9 Claims, 3 Drawing Sheets

FIG.2

| RANGE | FRICTION ELEMENT SPEED | F/C | H/C | R/C | OR/C | B/B | LR/B | FO/C | LO/C |
|---|---|---|---|---|---|---|---|---|---|
| D | 1 SPEED | O | × | × | × | × | × | O | O |
| | 2 SPEED | O | × | × | × | O | × | O | × |
| | 3 SPEED | O | O | × | × | × | × | O | × |
| | 4 SPEED | O | O | × | × | O | × | × | × |
| III | 1 SPEED | O | × | × | O | × | × | × | × |
| | 2 SPEED | O | × | × | O | O | × | × | × |
| | 3 SPEED | O | O | × | O | × | × | × | × |
| II | 1 SPEED | O | × | × | O | × | × | × | × |
| | 2 SPEED | O | × | × | O | O | × | × | × |
| I | 1 SPEED | O | × | × | O | × | O | × | × |
| R | REV. | × | × | O | × | × | O | × | × |
| | P, N | × | × | × | × | × | × | × | × |

ENGINE BRAKE CONTROL FOR AUTOMATIC TRANSMISSION

COPENDING RELATED APPLICATIONS

Reference should be made to the following copending U.S. applications which have been assigned to the assignee of the present application.

U.S. application Ser. No. 885,136, filed July 14, 1986 claiming priority on Japanese Patent Application No. 60-171866 filed on Aug. 6, 1985;

U.S. application Ser. No. 885,135, filed July 14, 1986 claiming priority on Japanese Patent Application No. 60-154244 filed on July 15, 1985;

U.S. application Ser. No. 890,371, filed July 29, 1986 claiming priority on Japanese Patent Application No. 60-166646 filed on July 30, 1985;

U.S. application Ser. No. 893,243, filed Aug. 5, 1986, now U.S. Pat. No. 4,680,992, claiming priority on Japanese Patent Applications No. 60-171154 filed on Aug. 5, 1985, No. 60-171865 filed on Aug. 6, 1985, No. 60-171869 filed on Aug. 6, 1985, and No. 60-197078 filed on Sept. 6, 1985;

U.S. application Ser. No. 905,078, filed Sept. 9, 1986 claiming priority on Japanese Patent Applications No. 60-199318 filed on Sept. 11, 1985, and No. 60-199319 filed on Sept. 11, 1985.

BACKGROUND OF THE INVENTION

The present invention relates to an engine brake control in an automatic transmission.

Automatic transmissions effect a shift between gears by a change-over in the power delivery path after selective actuation of one or more friction elements which may be of various kinds. It is the commonly employed practice to provide a one-way clutch which serves as a reaction member against a rotary member to establish a power delivery path.

With this one-way clutch, if the rotary member is subject to reverse torque, the one-way clutch is released to interrupt the transmission of this reverse torque. However, since the one-way clutch interrupts the transmission of reverse torque, no effective engine braking results.

Thus, a known automatic transmission is provided with a friction element which is arranged in parallel to a one-way clutch such that the friction element is activated to effect engine braking when a driver places a manual selector valve at a predetermined range position.

The engine brake control of this kind is employed for example in a H 700-R4 type transmission manufactured by General Motors Corporation. In this known transmission, as shown in diagram in FIG. 4, when a driver manipulates a manual lever 10 to place a spool of a manual selector valve 12 at an automatic shift drive range (D range) position as illustrated by the right half thereof as viewed in FIG. 4, line pressure $P_L$ from a circuit 13 is supplied to a circuit 14 leading to a shift valve 15. If, under this condition, shift pressure $P_S$ is available, a spool of the shift valve 15 is urged upwards to assume an upshift position as illustrated by the left half thereof where the hydraulic pressure from the circuit 14 is supplied to a circuit 16 leading to a shifting friction element 17 to activate the same to establish the nth speed (4th speed). If the shift pressure $P_S$ is not available, the spool of the shift valve 15 assumes a downshift position as illustrated by the right half thereof as viewed in FIG. 4 where the circuit 16 is connected to a drain port to discharge hydraulic fluid from the shifting friction element 17 to establish the n−1th speed (3rd speed) in cooperation with the action of a one-way clutch.

If, under the condition where the D range is selected, the driver wishes engine brake operation, he or she manipulates the manual lever 10 to place the spool of the manual selector valve 12 to a third speed engine brake range (III range) as illustrated by the left half thereof. In this position, line pressure $P_L$ from the circuit 13 is now supplied to a circuit 18 leading to an engine brake friction element 19 (an overrun clutch) to activate the same, causing engine braking during running with the n−1th speed (3rd speed). This friction element 19 is arranged in parallel to the above mentioned one-way clutch.

In order to prevent interlock which would be caused by engagement of friction element 19 while the friction element 17 remains engaged, the manual selector valve 12 is designed to drain fluid pressure from one of the circuits 14 and 18 before fluid pressure is supplied to the other.

Since in order to obtain engine braking the spool of the manual selector valve 12 has to move to the position where line pressure $P_L$ is supplied to the circuit 18 from the circuit 13, the number of ports of the manual selector valve 12 is increased and the stroke of the spool is also increased. This results in complicated manufacturing processes of the manual selector valve, and requires a complicated actuator system for operating the spool of the manual selector valve. Besides, in this known transmission, the manual selector valve has to be operated to effect engine braking. Thus, it is impossible to control engine braking in this transmission electronically.

An object of the present invention is to provide engine braking without relying on manipulation of a manual selector valve but still maintaining the function of preventing the above mentioned interlock from taking place.

SUMMARY OF THE INVENTION

An engine control according to the present invention is implemented in an automatic transmission for an automotive vehicle having an engine. The automatic transmission is shiftable between the nth speed and the n−1th speed, and includes a shifting friction element and a shift valve having a valve spool movable between an upshift position where the shifting friction element is activated to establish the nth speed and a downshift position where the shifting friction element is deactivated to establish the n−1th speed. The automatic transmission includes an engine brake friction element which is to be activated to effect engine braking. The engine brake control comprises:

means for generating an engine brake command signal;

means responsive to said engine brake command signal for holding the valve spool of the shift valve in the downshift position thereof where the shifting friction element is deactivated and activating the engine brake friction element.

Specifically, according to the present invention, there is provided in an automatic transmission a shift valve which is provided with a plug movable responsive to an engine brake command to hold a valve spool of the shift valve in a downshift position thereof. The plug is designed to supply working hydraulic pressure to an engine brake friction element after it has moved responsive to the engine brake command to hold the valve spool of the shift valve in the downshift position thereof. When the engine brake command is not available, the plug allows the valve spool of the shift valve to move between the downshift position thereof and an upshift position thereof.

BRIEF DESCRIPTION OF THE DRAWINGS

FIG. 2 illustrates the pattern of engagement and disengagement of the various friction elements in different speeds of the transmission shown in FIG. 1;

DESCRIPTION OF THE EMBODIMENT

Figure 1:
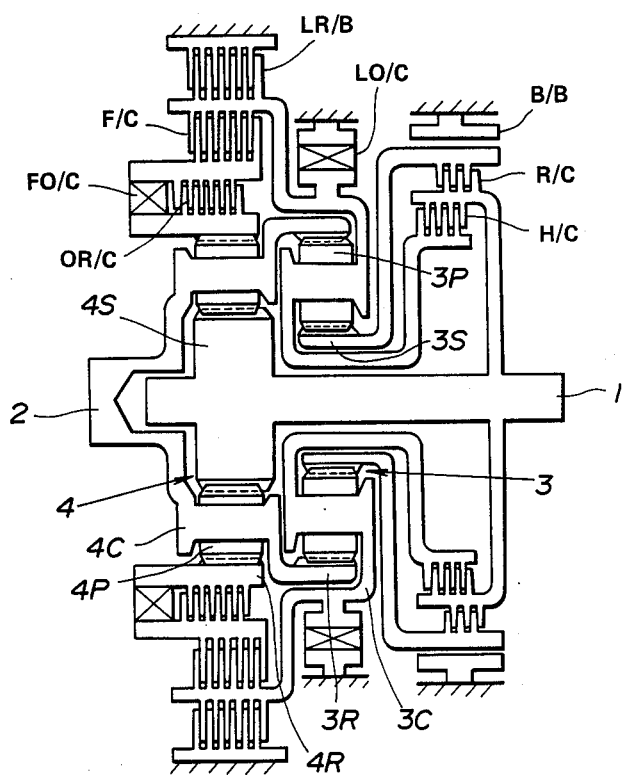
FIG. 1 is a schematic view of a transmission.

Referring to FIG. 1, the transmission illustrated herein is described in aforementioned copending U.S. application Ser. No. 885,136 claiming priority on Japanese Patent Application No. 60-171866 filed on Aug. 6, 1985. This U.S. application filed July 14, 1986 and assigned to the same assignee of the present application has been incorporated by reference in its entirety. Referring to FIG. 2, friction elements which are to be activated or engaged are denoted by the reference character o, while friction elements which are not to be activated or released are denoted by the reference character x. FIG. 2 shows the pattern of engagement and disengagement of various friction elements in different speeds of the transmission shown in FIG. 1.

Figure 3:
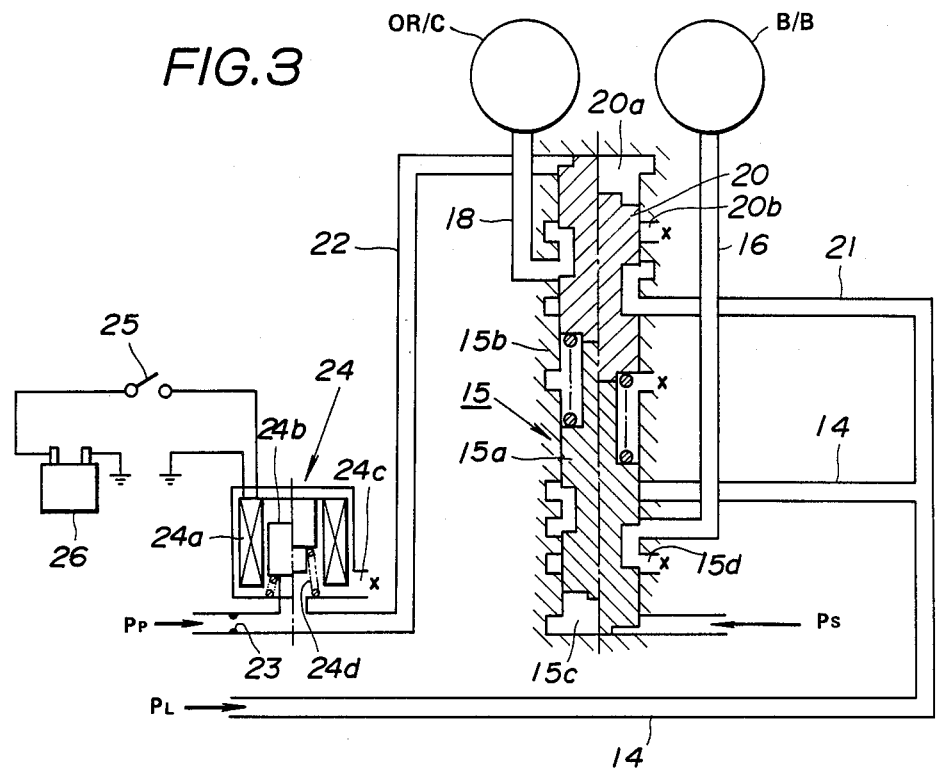
FIG. 3 is a diagram showing one embodiment of an engine brake control according to the present invention.
Figure 4:
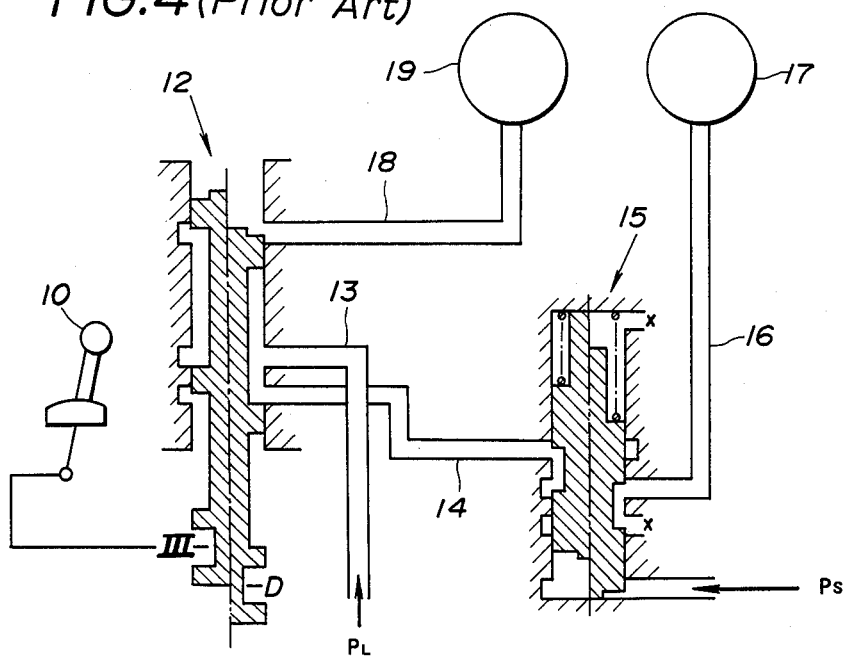
FIG. 4 is a diagram showing the previously discussed known engine brake control.

Referring to FIG. 3, there is diagrammatically shown an engine brake friction element, OR/C which is arranged in parallel to a forward one-way clutch FO/C in the automatic transmission shown in FIG. 1 and which is adapted to effect engine braking when it is activated or engaged. Also shown is a band brake B/B, as a shifting friction element. As will be understood from FIG. 2, the band brake B/B is activated or engaged to effect an upshift from the 3rd speed to the 4th speed, while it is released to effect a downshift from the 4th speed to the 3rd speed.

A shift valve 15 comprises within a valve bore a valve spool 15a, a plug 20, and a spring 15b operatively disposed between mutually facing ends of the valve spool 15a and the plug 20. When the plug 20 assumes an upper position as illustrated by the left half thereof as viewed in FIG. 3, the valve spool 15a is biased by the spring 15b to a spring set downshift position as illustrated by the right half thereof as viewed in FIG. 3. The valve spool 15a has on the remote end from the spring 15b a pressure acting end defining a chamber 15c. When a shift pressure $P_S$, viz., a hydraulic fluid pressure generated when an upshift from the 3rd speed to the 4th speed is controlled, is supplied to the chamber 15c, the spool 15a is urged for upward movement against the spring 15b to an upshift position as illustrated by the left half thereof as viewed in FIG. 3. When the valve spool 15a is in the downshift position, a circuit 16 leading to the shifting friction element B/B is connected to a drain port 15d to allow discharge of hydraulic fluid from the shifting friction element B/B, whereas when the valve spool 15a assumes the upshift position, the circuit 16 is connected to a circuit 14 to allow supply of hydraulic fluid to the shifting friction element B/B. The circuit 14 is adapted to be supplied with line fluid pressure $P_L$ from a manual selector valve (not shown) when the latter is placed at a D range.

The plug 20 has on the remote end from the spring 15b a pressure acting end defining a chamber 20a. Normally, the plug 20 is biased by the spring 15b to a spring set position as illustrated by the left half thereof as viewed in FIG. 3. In this position of the plug 20, a circuit 18 leading to the engine brake friction element OR/C is connected to a drain port 20b. When an engine brake command pressure is supplied to the chamber 20a, the plug 20 is urged for downward movement against the spring 15b to a position as illustrated by the right half thereof where the plug 20 holds the valve spool 15a to the downshift position thereof. In this position of the plug 20, the circuit 18 leading to the engine brake friction element OR/C is now connected to a branch circuit 21 from the circuit 14.

The engine brake command pressure builds up in an engine brake command signal generating circuit 22. This circuit 22 has one end connected to the chamber 20a and an opposite end connected to a source of pilot pressure $P_P$ having a predetermined magnitude. An orifice 23 is provided near the opposite end of the circuit 22 and a solenoid 24 is provided at a location of the circuit 22 between the orifice 23 and the chamber 20a. The solenoid 24 includes a coil 24a, a plunger 24b, and a spring 24d. When the coil 24a is not energized, the spring 24d presses the plunger 24b upward to a position as illustrated by the right half thereof where hydraulic fluid is discharged from the circuit 22 to a drain port 24c, resulting in no fluid pressure within the chamber 20a. When the coil 29a is energized, the plunger 24b is urged for downward movement against the spring 24d to block communication between the circuit 22 and the drain port 24c, allowing the engine brake command pressure as high as the pilot pressure $P_P$ to build up in the chamber 20a.

ON/OFF (Energization/Deenergization) of the coil 24a is controlled by an engine brake switch 25 which may be manually operated by a driver. The coil 24a is connected to a battery 26 via the switch 25.

The operation is hereinafter described.

In the case the engine brake switch 25 is placed in the OFF position thereof reflecting driver's intention that engine braking is not to be effected, the coil 24a is turned OFF or deenergized, causing no fluid pressure to build up in the chamber 20a. Under this condition, The plug 20 is held at the position as illustrated by the left half thereof by means of the spring 15b regardless of the position assumed by the valve spool 15a. With the plug 20 held in this position, illustrated by the left half thereof as viewed in FIG. 3, the valve spool 15a is allowed to stroke between the downshift position and the upshift position in response to the shift pressure $P_S$. When the shift pressure $P_S$ rises to a high level, the valve spool 15a is urged against the spring 15b to the upshift position as illustrated by the left half thereof where the circuit 16 is allowed to communicate with the circuit 14. This causes line pressure from the circuit 14 to reach the shifting friction element B/B via the circuit 16 for activation.

With the plug 20 held in the left half position thereof as viewed in FIG. 3, the circuit 18 is connected to the drain port 20b, leaving the engine brake friction element OR/C deactivated. This prevents the occurrence of interlock in the transmission, effecting establishment of the nth speed without any fear of interlock taking place.

When the shift pressure $P_S$ drops, the valve spool 15a is urged by the spring 15b to assume the downshift position as illustrated by the right half thereof where the circuit 16 is allowed to communicate with the drain port 15d, deactivating or releasing the shifting friction element B/B. This causes establishment of the n−1th speed. The plug 20 remains in the position as illustrated by the left half thereof as viewed in FIG. 3 even though the valve spool 15a has shifted to the downshift position as a result of the drop in the shift pressure $P_S$. Since in this position of the plug 20 the circuit 18 is in communication with the drain port 20b, the friction element OR/C remains deactivated or released. This does not cause engine braking.

In the case the engine brake switch 25 is placed in the ON position thereof reflecting the driver's intention that the engine braking be effected during running with the n−1th speed, the coil 24a is energized by current from the battery 26 to urge the plunger 24b against the spring 24d down to the position as illustrated by the left half thereof, blocking communication between the drain port 24c and the circuit 22, thus allowing the engine brake command pressure to build up in the chamber 20a. The engine brake command pressure building up in the chamber 20a holds the plug 20 down to the position illustrated by the right half thereof, thus holding the valve spool 15a to the downshift position as illustrated by the right half thereof as viewed in FIG. 3. In this position, the plug 20 allows the circuit 18 to communicate with the circuit 21, activating the engine brake friction element OR/C with line pressure from the circuit 21, and the valve spool 15a causes deactivation of the shifting friction element B/B, establishing the n−1th speed. Thus, engine braking results during running in the n−1th speed. The shifting friction element B/B is deactivated while the engine brake friction element OR/C is being activated, thus preventing interlock from taking place.

The engine brake switch 25 may be designed such that it is turned ON in response to release of an accelerator pedal or zero throttle opening degree of a throttle valve. Alternatively, the engine brake switch 25 may be operated in response to a signal pressure corresponding to throttle opening degree or engine load.

Since the action of the plug 20 is controlled by the switch 25, the engine brake may be controlled electronically. Besides, it is no longer necessary to use a manual selector valve formed with a special range for effecting engine braking. This is advantageous in that manufacturing of manual selector valves does not become complicated and the actuator system for the manual selector valve does not become complicated. In operation, since the plug 20 when activated moves to a predetermined position where it holds the valve spool 15a the shift valve 15 to the downshift position thereof and allows the supply of hydraulic pressure to be supplied to engine brake friction element OR/C, the interlock due to simultaneous engagement of both of the friction elements B/B and OR/C is prevented from taking place.

What is claimed is:

1. An apparatus, comprising:
    an automatic transmission for an automotive vehicle having an engine, the automatic transmission being shiftable between an nth speed and an n−1th speed, the automatic transmission including a shifting friction element and a shift valve having a valve spool movable between an upshift position where the shifting friction element is activated to establish the nth speed and a downshift position where the shifting friction element is deactivated to establish the n−1th speed, the automatic transmission including an engine brake friction element which is to be activated to effect engine braking, and
    an engine brake control comprising:
    means for generating an engine brake command signal; and
    means responsive to said engine brake command signal for activating the engine brake friction element independently of said valve spool and for holding the valve spool of the shift valve in the downshift position thereof where the shifting friction element is deactivated.

2. An apparatus, comprising:
    an automatic transmission for an automotive vehicle having an engine, the automatic transmission including an input member drivingly coupled to the engine and an output member subject to load from driving wheels of the automotive vehicle, the transmission also including a first rotary member, a second rotary member, an engine brake friction element adapted to be activated to establish a drive connection between the first rotary member and the second rotary member, and a one-way clutch arranged in parallel to the engine brake friction element such that when the engine brake friction element is deactivated the one-way clutch transmits forward torque from the first rotary member to the second rotary member, but interrupts transmission of reverse torque to the first rotary member from the second rotary member, the automatic transmission including a shifting friction element and a shift valve having a valve spool movable between an upshift position where the shifting friction element is activated to establish an nth speed and a downshift position where the shifting friction element is deactivated to establish an n−1th speed, and
    an engine brake control comprising:
    means for generating an engine brake command signal; and
    means movable responsive to said engine brake command signal for activating the engine brake friction element independently of said valve spool, said movable means being movable between a first position for allowing hydraulic fluid to discharge from the engine brake friction element and a second position for holding the valve spool of the shift valve in the downshift position thereof and supplying hydraulic fluid pressure to the engine brake friction element for activation.

3. An apparatus as claimed in claim 2, wherein said engine brake command signal generating means includes a hydraulic fluid circuit having one end connected to a source of pilot pressure and an opposite end connected to a chamber; solenoid means including a drain port, said solenoid means normally allowing fluid communication between said circuit and said drain port to bring down hydraulic pressure within said chamber toward zero, said solenoid means being operative to block said fluid communication between said circuit and said drain port to cause pressure build-up in said chamber; and means for selectively supplying electric current to said solenoid means for energization to render same operative.

4. An apparatus as claimed in claim 3, wherein said means movable responsive to said engine brake command signal includes a plug movable subject to the pressure within said chamber.

5. An apparatus, comprising:
an automatic transmission for an automotive vehicle having an engine, the automatic transmission being shiftable between an nth speed where a shifting friction element is activated and an n−1th speed where the shifting friction element is deactivated, the automatic transmission including an engine brake friction element which is to be activated to effect engine braking, and
an engine brake control comprising:
means for generating an engine brake command signal; and
a shift valve having a valve spool movable between an upshift position where the shifting friction element is activated to establish the nth speed and a downshift position where the shifting friction element is deactivated to establish the n−1th speed,
said shift valve including means movable responsive to said engine brake command signal for activating the engine brake friction element independently of said valve spool, said movable means being movable between a first position for discharging hydraulic fluid from the engine brake friction element and a second position for holding the valve spool of the shift valve in the downshift position thereof and causing activation of the engine brake friction element.

6. An apparatus as claimed in claim 5, wherein said means responsive to said engine brake command signal includes a plug.

7. An apparatus as claimed in claim 6, wherein said shift valve includes a spring operatively disposed between said valve spool and said plug, said plug having one end subject to force of said spring and a remote end from said spring defining a chamber, said plug being movable against said spring toward said valve spool to hold said valve spool in the downshift position thereof in response to pressure build-up in said chamber.

8. An apparatus as claimed in claim 7, wherein said engine brake command signal generating means includes a hydraulic fluid circuit having one end connected to a source of pilot pressure and an opposite end connected to said chamber; solenoid means including a drain port, said solenoid means normally allowing fluid communication between said circuit and said drain port to bring down hydraulic pressure within said chamber toward zero, said solenoid means being operative to block said fluid communication between said circuit and said drain port to cause pressure build-up in said chamber; and means for selectively supplying electric current to said solenoid means for energization to render same operative.

9. An apparatus as claimed in claim 8, wherein said plug serves as a valve to selectively supply hydraulic fluid to and discharge hydraulic fluid from the engine brake shifting element upon assuming said predetermined position.

* * * * *